United States Patent [19]
Simpson

[11] 3,875,644
[45] Apr. 8, 1975

[54] HYDRAULIC BRAKE TUBE SEAT REPLACEMENT TOOL

[76] Inventor: Olen W. Simpson, 3257 S. Madole, Oklahoma City, Okla. 73159

[22] Filed: July 20, 1973

[21] Appl. No.: 381,323

[52] U.S. Cl. ............................................. 29/254
[51] Int. Cl. ............................................. B25b 27/02
[58] Field of Search ............. 29/254, 275; 81/52.35; 173/91; 72/457

[56] References Cited
UNITED STATES PATENTS 3,030,837  4/1962  Chartier ................................ 72/457
3,783,492  1/1974  Duckett et al. .................... 29/275 X Primary Examiner—Al Lawrence Smith
Assistant Examiner—Harold P. Smith, Jr.
Attorney, Agent, or Firm—Robert K. Rhea

[57] ABSTRACT

An elongated shaft is provided with a coaxial socket in one end removably receiving a brake master cylinder tube seat supporting a mandrel. A sleeve longitudinally slidably surrounds the shaft between a pair of spaced-apart stops for driving the shaft toward and away from a tube seat position in response to manual movement of the sleeve.

2 Claims, 5 Drawing Figures

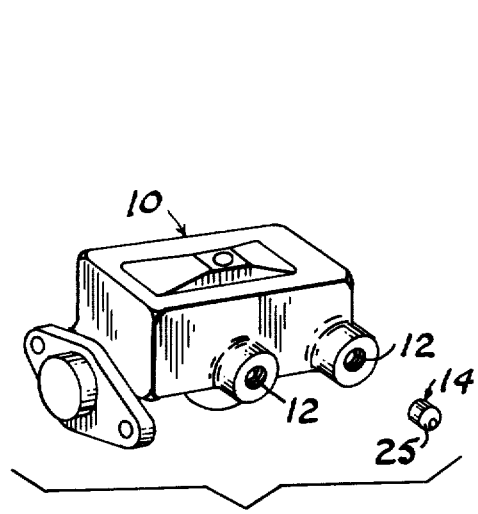
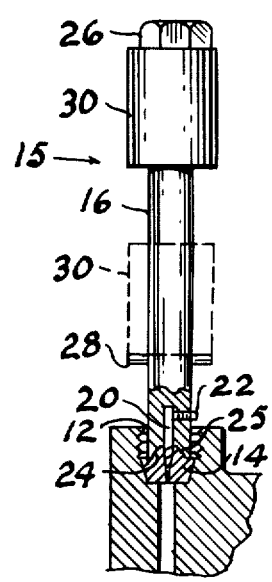
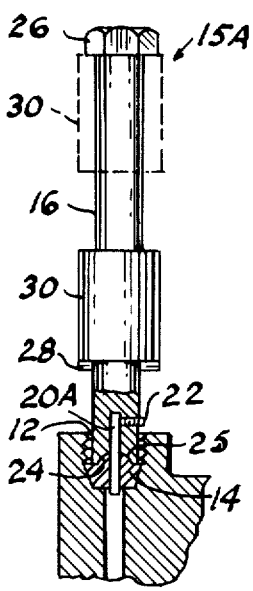
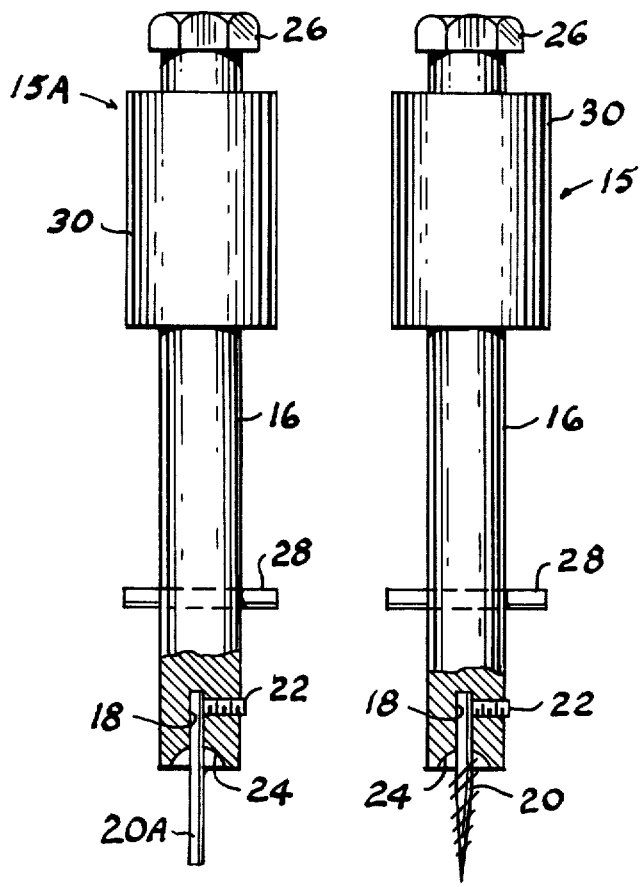

HYDRAULIC BRAKE TUBE SEAT REPLACEMENT TOOL

BACKGROUND OF THE INVENTION

1. Field of the Invention

The present invention relates to automotive brake repair tools and more particularly to a tool for removing and replacing tube seats connecting fluid lines to master cylinder ports.

Automotive master brake cylinders are provided with inlet and outlet ports having a check valve adjacent the port which is held in place by a tube seat which is contacted by and seats the fluid line fitting. In order to repair or replace the check valve, the tube seat must be removed which is not easily accomplished, because of the small size and confined space. It is, therefore, desirable that some means be provided for removing and replacing the tube seats.

2. Description of the Prior Art

I do not know of any prior art patents disclosing a tool of this type.

SUMMARY OF THE INVENTION

An elongated shaft capable of having one end inserted into the inlet or outlet port of a hydraulic brake master cylinder is provided with a coaxial socket which removably receives a tube seat supporting mandrel. A counterbore, coaxial with the socket, nests one end portion of a tube seat and prevents damage thereto. The other end of the shaft is provided with a stop block and a stop pin is transversely secured to the shaft intermediate its ends. A sleeve slidably surrounds the shaft between the stop block and stop pin for forcing the shaft toward and away from a tube seat disposed within the brake cylinder port in response to manual to and fro movement of the sleeve.

The principle object is to provide a tool for removing and replacing a tube seat within a brake master cylinder port.

BRIEF DESCRIPTION OF THE DRAWINGS

FIG. 1 is a perspective view of a conventional brake master cylinder having one tube seat shown in exploded relation with respect to one port of the master cylinder;

FIG. 2 is an elevational view of the tool, partially in section, illustrating a tube seat removable mandrel;

FIG. 3 is a view similar to FIG. 2 illustrating a tube seat installation mandrel; and, FIGS. 4 and 5 are elevational views, partially in section, to a smaller scale, illustrating the tool when using the mandrels shown in FIGS. 2 and 3, respectively, with movement of the sleeve being illustrated by dotted lines.

DESCRIPTION OF THE PREFERRED EMBODIMENT

Like characters of reference designate like parts in those figures of the drawings in which they occur.

In the drawings:

The reference numeral 10 indicates a substantially conventional automotive hydraulic brake master cylinder having inlet and outlet ports 12 formed in one wall of the cylinder body. The ports 12 are internally threaded for receiving a hydraulic fluid conducting tube fitting connecting a hydraulic line to the ports, neither being shown. The ports 12 each receive a tube seat 14 near the inward limit of the port threads. The tube seat 14 must be removed to replace check valves contained by the master cylinder. These tube seats 14 are not easily removed and replaced without damaging the tube seat or the surface against which it fits.

Referring more particularly to FIGS. 2 and 4, the reference numeral 15 indicates the tool, as a whole, comprising an elongated shaft 16 having an outside diameter freely received by the master cylinder ports 12. One end of the shaft 16 is coaxially bored to form a socket 18 for receiving one end portion of a mandrel 20 which is held in place by a set screw 22 threadedly engaged with a threaded bore formed in the wall of the shaft 16. The other end portion of the mandrel is provided with sheet metal type threads and projects coaxially beyond the end limit of the shaft 16. This end of the shaft is also provided with a counterbore forming a recess 24 formed on a radius complemental with the radius forming a fitting seat 25 on one end of the tube seat 14. The other end portion of the shaft 16 is provided with a wrench head forming a stop block 26. Intermediate its ends, the shaft is transversely drilled for receiving a stop pin 28 having a length greater than the diameter of the shaft. A sleeve 30 coaxially slidably surrounds the shaft 16 between the stop block 26 and stop pin 28.

Referring more particularly to FIGS. 3 and 5, the numeral 15A indicates a modified form of the tool 15 including identically numbered parts with the exception of the mandrel 20. In this embodiment the screw fitting mandrel 20 is replaced by a pinlike mandrel 20A, sized for coaxial reception by the bore of the tube seat 14 for supporting the tube seat when installing it within the master cylinder ports 12.

OPERATION

In operation assuming the tube seat 14 is to be removed from one of the master cylinder ports 12. The free end of the threaded mandrel 20 is manually disposed within the bore of the tube seat and the shaft rotated about its longitudinal axis as by using a wrench, not shown, on the stop block 26 this engages the screw threads of the mandrel 20 with the wall forming the bore of the tube seat. The sleeve 30 is then reciprocated longitudinally of the shaft and forced against the stop block 26, in a hammering action, which releases the tube seat from engagement within the port 12. When the tube seat 14, or when a new one, is to be installed in the port 12, the tube seat 14 is coaxially disposed on the free end portion of the pin mandrel 28 and then disposed within the port 12. Light blows with a hammer, or the like, not shown, may then be used on the stop block 26 to insure that the tube seat is properly positioned in the port 12. During this action the arcuate recess 24 prevents damage to the arcuate seat surface 25 of the tube seat. The tool 15A is then removed from the port.

Obviously the invention is susceptible to changes or alterations without defeating its practicability, therefore, I do not wish to be confined to the preferred embodiment shown in the drawings and described herein.

I claim:

1. A repair tool for removing and replacing a centrally bored tube seat in brake master cylinder ports, comprising:

an elongated shaft having a coaxial socket forming bore in one of its ends, said shaft having a hemispherical recess formed therein coaxial with the socket forming bore for nesting one end portion of a tube seat;

tube supporting means including a pin-like mandrel having one end portion fixed within the shaft socket and projecting, at its other end portion, beyond said shaft a distance at least equal to the length of the bore of a tube seat to be replaced;

a stop pin transversely secured to said shaft intermediate its ends;

a stop block secured to the other end of said shaft; and, a sleeve slidably disposed on said shaft between and movable toward and away from said stop pin and said stop block.

2. The tool according to claim 1 in which said other end portion of said mandrel is provided with external threads adapted to engage and grip the wall forming the bore of a tube seat to be removed.

* * * * *